US012553410B2

(12) United States Patent
Achten

(10) Patent No.: US 12,553,410 B2
(45) Date of Patent: Feb. 17, 2026

(54) HYDRAULIC DEVICE

(71) Applicant: BUCHER HYDRAULICS AG, Neuheim (CH)

(72) Inventor: Peter Augustinus Johannes Achten, Eindhoven (NL)

(73) Assignee: BUCHER HYDRAULICS AG, Neuheim (CH)

( * ) Notice: Subject to any disclaimer, the term of this patent is extended or adjusted under 35 U.S.C. 154(b) by 0 days.

(21) Appl. No.: 18/876,555

(22) PCT Filed: Jun. 20, 2023

(86) PCT No.: PCT/EP2023/066616
§ 371 (c)(1),
(2) Date: Dec. 18, 2024

(87) PCT Pub. No.: WO2023/247524
PCT Pub. Date: Dec. 28, 2023

(65) Prior Publication Data

US 2025/0361849 A1 Nov. 27, 2025

(30) Foreign Application Priority Data

Jun. 21, 2022 (EP) .................................... 22180081

(51) Int. Cl.
*F03C 1/06* (2006.01)
*F01B 3/00* (2006.01)
(Continued)

(52) U.S. Cl.
CPC .............. *F03C 1/06* (2013.01); *F01B 3/0038* (2013.01); *F03C 1/0642* (2013.01);
(Continued)

(58) Field of Classification Search
CPC ........ F03C 1/06; F03C 1/0642; F04B 1/2007; F04B 1/2035; F04B 1/2071; F04B 3/0038; F04B 1/24; F01B 3/0038
See application file for complete search history.

(56) References Cited

U.S. PATENT DOCUMENTS 6,595,886 B1 7/2003 Forster
7,328,647 B2 2/2008 Achten
(Continued)

FOREIGN PATENT DOCUMENTS

EP 1508694 A1 2/2005
EP 1855002 A1 * 11/2007 ............ F04B 1/2007
(Continued)

OTHER PUBLICATIONS

International Search Report and Written Opinion in corresponding International Application Serial No. PCT/EP2023/066616 dated Jul. 19, 2023.

*Primary Examiner* — Kenneth J Hansen
(74) *Attorney, Agent, or Firm* — Steven M. Koehler; Westman, Champlin & Koehler, P.A.

(57) ABSTRACT

A hydraulic device comprises a housing and a shaft with a flange extending perpendicularly to a first axis of rotation. A plurality of pistons are fixed to the flange and move each in a sleeve supported by and rotatable with a barrel plate. The barrel plate is provided with a plurality of actuators for exerting counter forces (Fa) on the respective sleeves in a direction and at a location such that at least when one of the pistons is at bottom dead center under operating conditions the counter force on the cooperating sleeve acts along a line at a distance from the center point of the piston head and causes a counter torque about the center point of the piston head against the tilting torque, wherein the actuators are controlled such that the counter forces increase with increas-
(Continued)

ing rotational speed of the barrel plate about the second axis of rotation.

20 Claims, 6 Drawing Sheets

(51) Int. Cl.

| | |
|---|---|
| ***F04B 1/2035*** | (2020.01) |
| ***F04B 1/22*** | (2006.01) |
| ***F04B 1/30*** | (2020.01) |

(52) U.S. Cl.
CPC ............. *F04B 1/2035* (2013.01); *F04B 1/22* (2013.01); *F04B 1/30* (2013.01)

(56) References Cited

U.S. PATENT DOCUMENTS

| | | | |
|---|---|---|---|
| 2005/0017573 | A1 | 1/2005 | Achten |
| 2005/0019171 | A1 | 1/2005 | Achten |
| 2005/0201879 | A1 | 9/2005 | Achten |
| 2006/0222516 | A1 | 10/2006 | Achten |
| 2008/0250920 | A1 | 10/2008 | Hermann et al. |
| 2019/0211811 | A1 | 7/2019 | Achten |

FOREIGN PATENT DOCUMENTS

| | | | |
|---|---|---|---|
| WO | 2006083163 | A1 | 8/2006 |
| WO | 3246567 | A1 | 11/2017 |

* cited by examiner

HYDRAULIC DEVICE

CROSS-REFERENCE TO RELATED APPLICATION(S)

This Application is a Section 371 National Stage Application of International Application No. PCT/EP2023/066616, filed Jun. 20, 2023 and published as WO 2023/247524 A1 on Dec. 28, 2023, in English, and further claims priority to European patent application Ser. No. 22180081.6, filed Jun. 21, 2022.

BACKGROUND

The present invention relates to a hydraulic device comprising a housing, a shaft which is mounted in the housing and rotatable about a first axis of rotation, wherein the shaft has a flange extending perpendicularly to the first axis of rotation, a plurality of pistons including respective spherical piston heads having respective center points, which pistons are fixed to the flange at equiangular distance about the first axis of rotation and which have centerlines parallel to the first axis of rotation, a plurality of separate sleeves within which the respective pistons are movable and a barrel plate which supports the sleeves, wherein the barrel plate including the sleeves are rotatable about a second axis of rotation which intersects the first axis of rotation by an acute angle such that upon rotating the shaft and the barrel plate including the sleeves each of the pistons moves with respect to the cooperating sleeve between a bottom dead center and a top dead center, wherein the sleeves are adapted such that at least when one of the pistons is at bottom dead center under operating conditions a centrifugal force on the cooperating sleeve acts in radial direction from the second axis of rotation between the barrel plate and a center point of the piston head causing a tilting torque about the center point of the piston head.

Such a hydraulic device is known from WO 2006/083163. The known hydraulic device has two barrel plates having first sides which are supported by respective face plates. The sleeves rest on second sides of the barrel plates which are opposite to the first sides. The sleeves are movable on the barrel plates, since they follow non-circular paths about the second axes of rotation under operating conditions, whereas the pistons follow a circular path about the first axis of rotation. The paths which are followed by the sleeves on the barrel plates also depend on the transmission between the shaft and the barrel plate, which phenomenon is described in EP 1 508 694. In order to minimize friction there is a layer of hydraulic fluid between each of the sleeves and the corresponding barrel plate. In other words, the sleeves float on the barrel plates. Each of the piston heads fits within the cooperating sleeve resulting in a sealing line between the piston head and the sleeve, hence creating a compression chamber. When the piston is at bottom dead center the center of gravity of the sleeve lies between the barrel plate and the center point of the piston head which means that the centrifugal force on the sleeve causes the tilting torque. Due to the tilting torque the sleeve tends to tilt about the center point of the piston head, since the center point forms a pivot point in fact. The tilting torque level varies during movement of the piston within the sleeve, since it depends on the actual location of the center of gravity of the sleeve including the hydraulic fluid in the sleeve, although the effect of the hydraulic fluid is relatively small. When under operating conditions the piston moves from bottom dead center to top dead center the distance between the center of gravity and the center point of the piston head will decrease first. At a certain angular position of the barrel plate about the second axis of rotation the center point of the piston head and the center of gravity of the sleeve including the hydraulic fluid in the compression chamber may coincide; at top dead center the center of gravity may even lie beyond the center point of the piston head as seen from the barrel plate.

In the known hydraulic device tilting of the sleeves is partly prevented by the fact that the sleeves are pressed against the barrel plate through the pressure in the compression chambers since diameters of through-holes in sleeve bottoms of the respective sleeves are smaller than diameters of sleeve jackets which extend from the respective sleeve bottoms. The pressing force depends on this pressure and changes with the rotation of the shaft. When the oil pressure is relatively low, for example when oil is sucked into the compression chamber during a part of the rotation of the shaft, the pressing force is very low and this may lead to a tilting of the sleeve as a result of the centrifugal force. This leads to a gap between the sleeve and the barrel plate such that oil can leak through the gap. Any leakage lowers the efficiency of the hydraulic device, which is a drawback. Therefore, the known hydraulic device is also provided with a retaining element which presses each sleeve against the barrel plate by individually acting spring means. A disadvantage of the known hydraulic device is that at high rotational speed the spring force is not sufficient to avoid tilting of the sleeves. The hydraulic device as described in EP 1 855 002 has the same disadvantage.

When the shaft rotates at high speed the tilting torques on the respective sleeves also cause resultant tilting torques on the respective cooperating barrel plates. This may lead to a leakage between each pair of the barrel plate and the face plate.

SUMMARY

A hydraulic device herein disclosed includes a barrel plate provided with a plurality of actuators for exerting counter forces on the respective sleeves in a direction and at a location such that at least when one of the pistons is at bottom dead center under operating conditions the counter force on the cooperating sleeve acts along a line at a distance from the center point of the piston head and causes a counter torque about the center point of the piston head against the tilting torque, wherein the actuators are controlled such that the counter forces increase with increasing rotational speed of the barrel plate about the second axis of rotation.

An advantage of the presence of the actuators is that the counter forces are exerted actively. This means that the counter forces are not dependent on tilting movements of the sleeves such as in case of passive spring means.

The actuators may be adapted such that the counter forces on the respective sleeves are substantially the same when the shaft runs at a fixed speed. This means that the counter forces exerted by the actuators are independent from the rotational position of the shaft.

The counter forces may act in radial direction of the second axis of rotation.

The counter forces may be directed to the second axis of rotation.

At least when one of the pistons is in bottom dead center the counter force may be exerted on the corresponding sleeve at a location between the barrel plate and the center of the piston head.

Preferably, the counter forces are exerted on the sleeves at a distance from the barrel plate where the center of gravity of the respective sleeves is located or close to that location, since the centrifugal force can be balanced such that the tilting torque is minimized, independent from the rotational position of the barrel plate. The location of the centrifugal force on the sleeve including the hydraulic fluid inside the sleeve depends on the rotational position of the barrel plate, but the weight of the sleeve is larger than of the hydraulic fluid in the sleeve and more or less dictates the center of gravity.

The counter forces may be exerted on outer sides of the sleeves facing away from the second axis of rotation. The counter forces are directed to the second axis of rotation in this case.

Each of the actuators may comprise a counterweight which is coupled to the barrel plate and movable with respect to the barrel plate in radial direction of the second axis of rotation and which cooperates through a transmission with the corresponding sleeve for exerting the counter force on the corresponding sleeve, wherein the transmission and the counterweight are adapted such that under operating conditions a centrifugal force on the counterweight causes the transmission to exert the counter force on the corresponding sleeve. In this case the counterweight rotates together with the barrel plate which means that the centrifugal force on the counterweight automatically increases the counterforce with increasing rotational speed of the barrel plate about the second axis of rotation.

In a particular embodiment the transmission comprises a lever which is mounted to the barrel plate through a pivot having a pivot axis, wherein the lever comprises a first arm and a second arm which extend in different directions from the pivot axis, wherein the first arm cooperates with the corresponding sleeve for exerting the counter force on the corresponding sleeve and the second arm comprises the counterweight, wherein the lever is adapted such that under operating conditions a centrifugal force on the second arm due to the counterweight causes the first arm to exert the counter force on the corresponding sleeve. This is a relatively simple mechanical structure to generate the counter forces on the sleeves.

The pivot axes may extend parallel to the second axis of rotation.

The pivot may comprise a ridge at one of the lever and the barrel plate, which ridge is supported by the other one of the lever and the barrel plate, hence forming a fulcrum.

In a practical embodiment the ridge is provided at the lever and the barrel plate comprises a ring-shaped barrel plate wall which supports the ridges of the respective levers.

Each of the levers may be provided with a projection at the corresponding ridge which projection is located in a cooperating hole in the barrel plate wall or each of the levers may be provided with a hole at the corresponding ridge which hole accommodates a cooperating projection on the barrel plate wall, wherein the hole and the projection allow a pivoting movement of the lever with respect to the barrel plate about the pivot axis. This configuration facilitates assembling of the levers and the barrel plate and locks the levers with respect to the barrel plate in circumferential direction thereof.

The second arm of each lever may be partly located between two adjacent sleeves. This makes the hydraulic device compact.

BRIEF DESCRIPTION OF THE DRAWINGS

In an alternative embodiment the pivot axes extend tangentially to the barrel plate.

The invention will hereafter be elucidated with reference to very schematic drawings showing embodiments of the invention by way of example.

DETAILED DESCRIPTION OF ILLUSTRATIVE EMBODIMENTS

Figure 1:
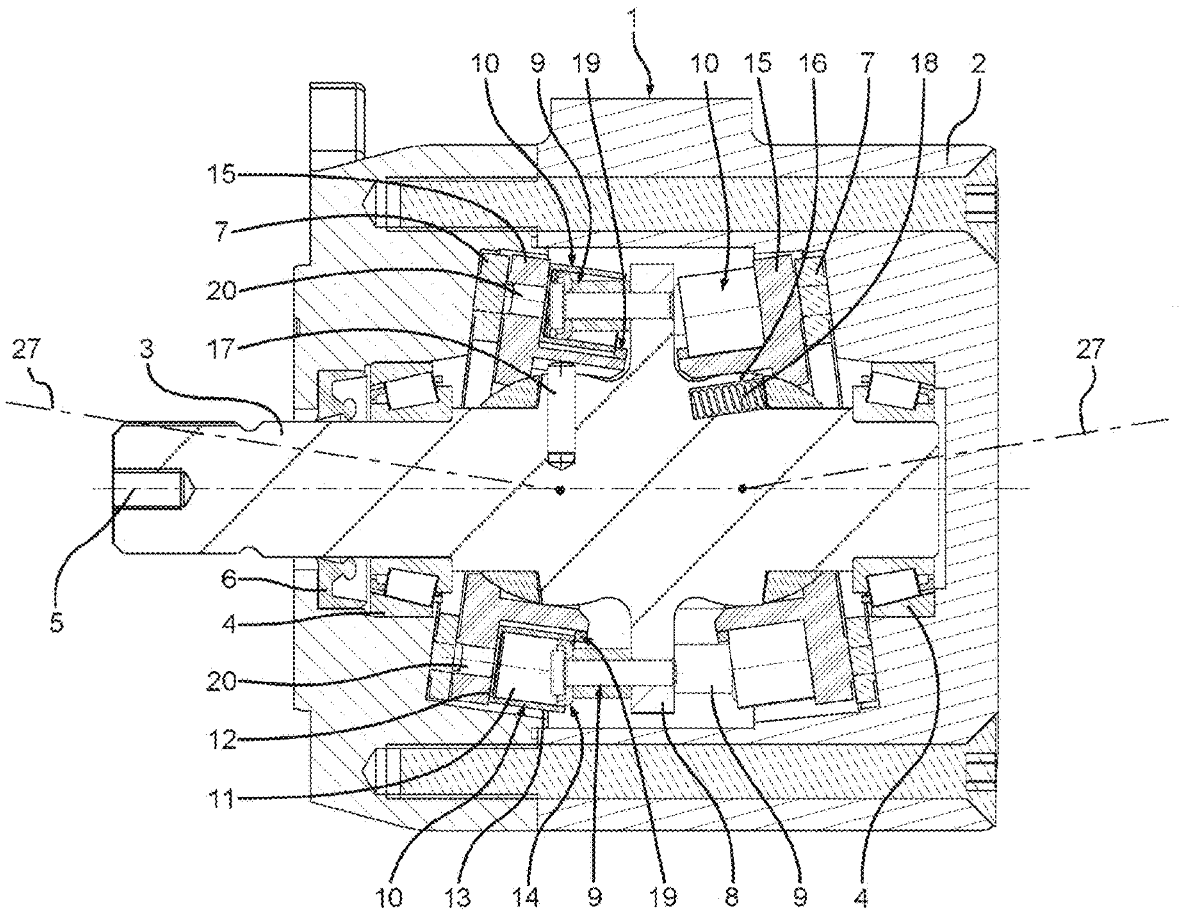
FIG. 1 is a cross-sectional view of an embodiment of a hydraulic device.

FIG. 1 shows internal parts of a hydraulic device 1, such as a pump, hydromotor or hydraulic transformer, which are fitted into a housing 2 in a known manner. The hydraulic device 1 is provided with a shaft 3 which is supported by bearings 4 at both sides of the housing 2 and which is rotatable about a first axis of rotation 5. The housing 2 is provided on the one side with an opening with a shaft seal 6 in a known manner, as a result of which the end of the shaft 3 protrudes from the housing 2. A motor can be coupled to the end of the shaft 3 if the hydraulic device 1 is a pump, and a driven tool can be coupled thereto if the hydraulic device 1 is a motor.

The hydraulic device 1 comprises face plates 7 which are mounted inside the housing 2 at a distance from each other. In the embodiment as shown the face plates 7 have fixed positions with respect to the housing 2 in rotational direction thereof, but they may be rotatable with respect to the housing 2 in an alternative embodiment. The shaft 3 extends through central through-holes in the face plates 7.

The shaft 3 is provided with a flange 8 which extends perpendicularly to the first axis of rotation 5. A plurality of pistons 9 are fixed at both sides of the flange 8 at equiangular distance about the first axis of rotation 5, in this case fourteen pistons 9 on either side. Each of the pistons 9 has a modular structure, but this may be different in an alternative embodiment. The pistons 9 have center lines which extend parallel to the first axis of rotation 5. The planes of the face plates 7 are angled with respect to each other and with respect to the plane of the flange 8 in the embodiment as shown in FIG. 1.

Each of the pistons 9 cooperates with a separate sleeve 10 to form a compression chamber 11 of variable volume. The hydraulic device 1 as shown in FIG. 1 has 28 compression chambers 11. Each of the sleeves 10 comprises a sleeve bottom 12 and a circular-cylindrical sleeve jacket 13. The sleeve jacket 13 extends from the sleeve bottom 12. Each piston 9 is sealed directly to the inner wall of the sleeve jacket 13 through a piston head 14 which has a spherical outer side including a center point.

The sleeve bottoms 12 of the respective sleeves 10 are supported by respective barrel plates 15 which are fitted around the shaft 3 by means of respective ball hinges 16 and are coupled to the shaft 3 by means of keys 17. Consequently, the barrel plates 15 rotate together with the shaft 3 under operating conditions. The sides of the respective barrel plates 15 which are directed away from the flange 8 are supported by respective supporting surfaces of the face plates 7. Due to the inclined orientation of the face plates 7 with respect to the flange 8 the barrel plates 15 pivot about the ball hinges 16 during rotation with the shaft 3. The barrel plates 15 rotate about respective second axes of rotation 27 which are angled by acute angles with respect to the first axis of rotation 5. This means that the sleeves 10 also rotate about the respective second axes of rotation 27. As a consequence, upon rotating the shaft 3 the volumes of the compression chambers 11 change.

During rotation of the barrel plates 15 each sleeve 10 makes a combined translating and swivelling motion around the cooperating piston 9. Therefore, the outer side of each piston head 14 is spherical. The spherical shape creates a sealing line between the piston head 14 and the sleeve jacket 13 which extends perpendicularly to the center line of the cooperating sleeve 10. The diameter of each piston 9 near the flange 8 is smaller than at the piston head 14 in order to allow the relative motion of the cooperating sleeves 10 about the pistons 9. Under operating conditions each of the pistons 9 moves inside the cooperating sleeve 10 between a bottom dead center and a top dead center. In FIG. 1 the upper piston 9 at the left barrel plate 15 is in top dead center and the lower piston 9 at the left barrel plate 15 is in bottom dead center.

The angle between the first axis of rotation and the respective second axes of rotation 27 is approximately nine degrees in practice, but may be smaller or larger.

Under operating conditions a tiny layer of hydraulic fluid is present between the sleeve bottoms 12 and the corresponding barrel plates 15 which causes the sleeves 10 to float on the respective barrel plates 15. This minimizes friction between the sleeve bottoms 12 and the barrel plates 15, since the sleeves 10 slightly move on the barrel plates 15 in a direction perpendicular to the second axis of rotation 27, which movement is explained in EP 1 508 694, for example.

The sleeves 10 are locked to the barrel plates 15 in a direction parallel to the respective second axes of rotation 27 by means of retaining elements 19 in order to keep the sleeves 10 against the barrel plates 15 during starting-up the hydraulic device 1 when hydraulic pressure must still increase. The forces of the retaining elements 19 on the sleeves 10 are limited.

The barrel plates 15 are pressed against the respective face plates 7 by means of springs 18 which are mounted in holes in the shaft 3 and which press respective cheeks against the face plates 7. The compression chambers 11 communicate via central through-holes in the respective sleeve bottoms 12 with cooperating passages 20 in the barrel plates 15. The passages 20 in the barrel plates 15 communicate via passages in the face plates 7 with a high-pressure port and a low-pressure port in the housing 2.

Figure 2:
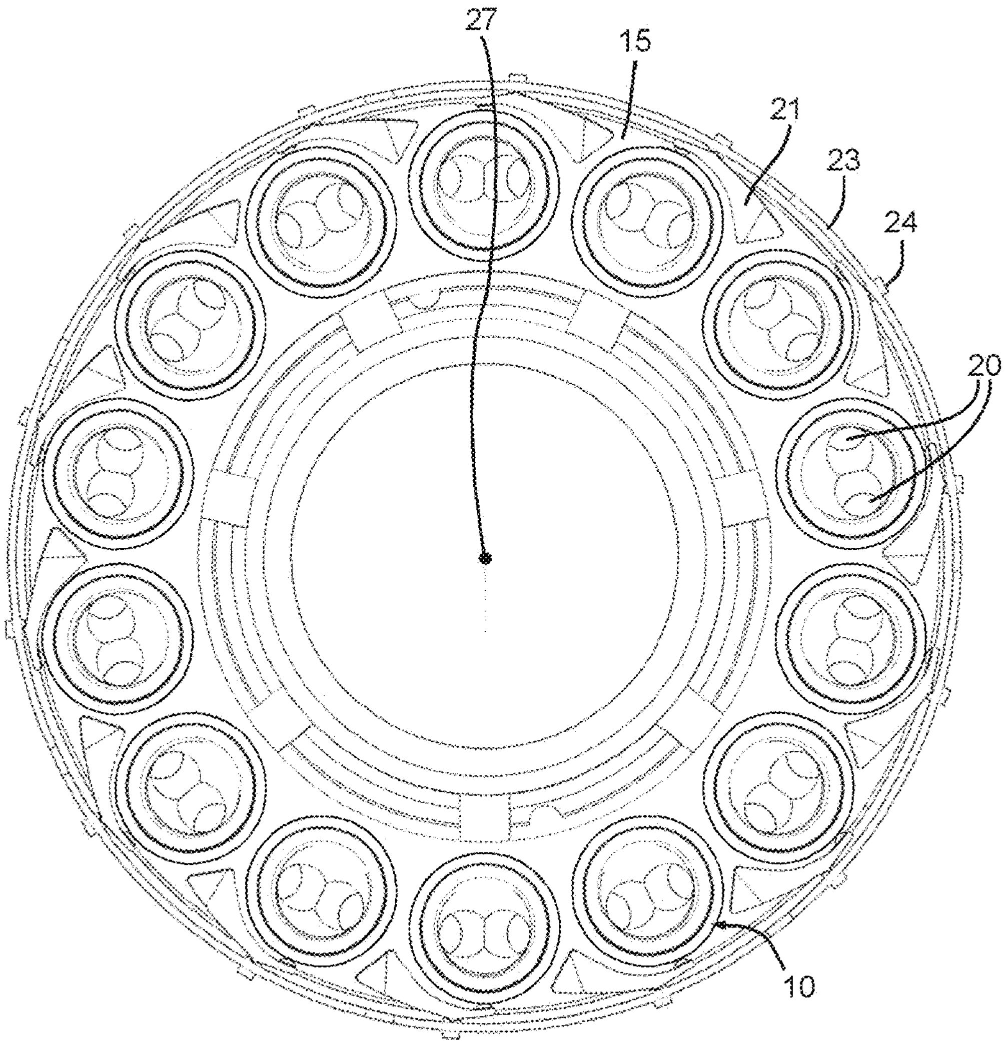
FIG. 2 is an enlarged top view of a part of the hydraulic device as shown in FIG. 1.
Figure 3:
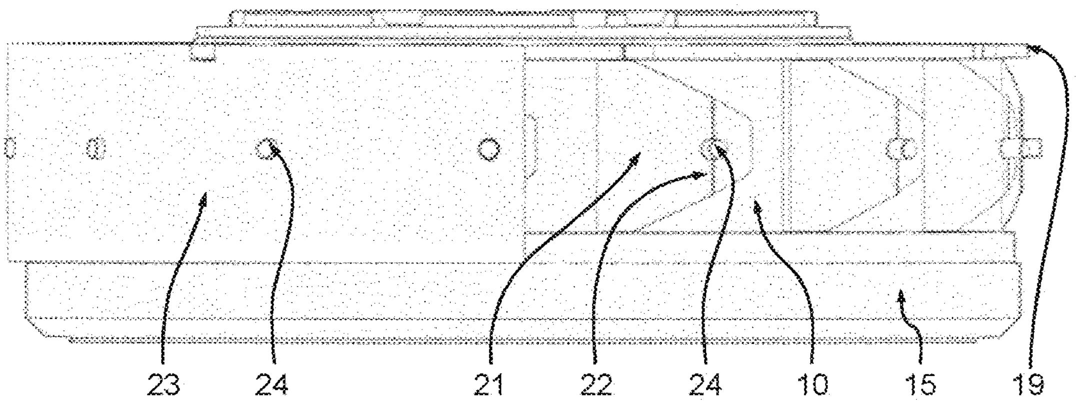
FIG. 3 is a cut-away side view of the part as shown in FIG. 2.
Figure 4:
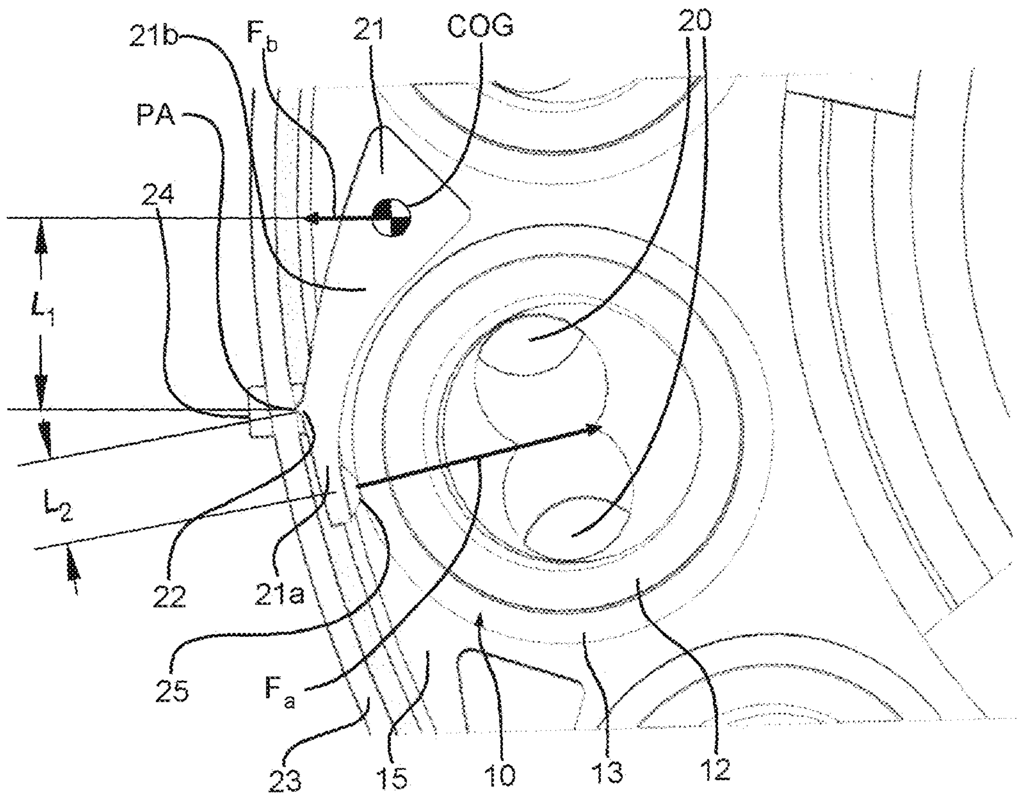
FIG. 4 is an enlarged view of a part of FIG. 2, illustrating forces under operating conditions.
Figure 5:
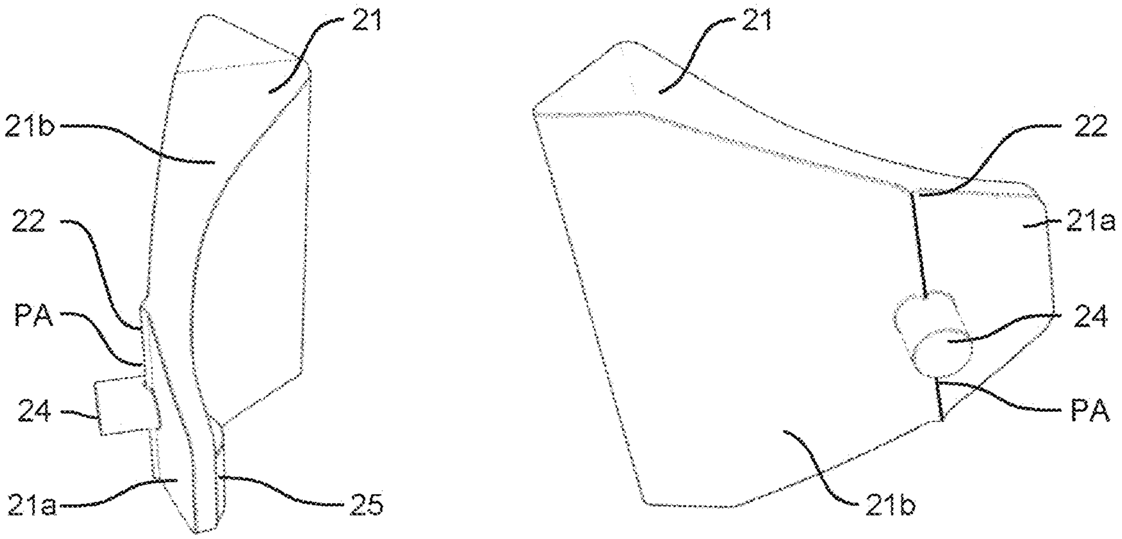
FIG. 5 is an enlarged perspective view of a lever as seen from different sides, which lever is also visible in FIGS. 2-4.

FIGS. 2-4 show one of the barrel plates 15 and the corresponding sleeves 10 in more detail. The barrel plate 15 is provided with a plurality of actuators in the form of levers 21 which are located next to the respective sleeves 10 and which cooperate with the respective sleeve jackets 13. FIG. 5 shows one of the levers 21 as seen from different sides. Each of the levers 21 is provided with a ridge 22 which is supported by an inner side of a ring-shaped barrel plate wall 23. The barrel plate wall 23 is fixed to or part of the barrel plate 15. Contact locations of the barrel plate wall 23 which support the respective ridges 22 form fulcrums. Each fulcrum and ridge 22 form a pivot of the corresponding lever 21 including a pivot axis PA that extends parallel to the second axis of rotation 27, see FIGS. 4 and 5.

Each of the levers 21 is mounted to the barrel plate wall 23 by means of a pin 24 which projects from the ridge 22 and passes through a cooperating through-hole in the barrel plate wall 23. This keeps the lever 21 in place in circumferential direction of the barrel plate wall 23. There is sufficient play between the pin 24 and the through-hole in the barrel plate wall 23 to allow the lever 21 to tilt about the corresponding pivot axis PA. FIG. 3 shows that the width of the second arm **21*b* of each of the levers 21 as measured in axial direction of the second axis of rotation 27 increases in a direction from the pivot axis PA to its free end. The free ends are locked in axial direction of the second axis of rotation 21 between the barrel plate 15 and the retaining element 19**.

In an alternative embodiment (not shown) the pins 24 may be fixed to the barrel plate wall 23 whereas the cooperating holes are located in the respective levers 21.

FIG. 5 shows that each of the levers 21 comprises a first arm **21*a* and a second arm 21*b* which extend in different directions from the pivot axis PA. The first arm 21*a* cooperates with the corresponding sleeve jacket 13. The first arm 21*a* has a semi-cylindrical pusher 25 which contacts a side of the sleeve jacket 13 that faces away from the second axis of rotation 27. The second arm 21*b* is larger and heavier than the first arm 21*a* and forms a counterweight. FIG. 4 shows the center of gravity COG of the second arm 21*b* and a resulting centrifugal force Fb on the lever 21 under operating conditions. Consequently, the lever 21 causes the first arm 21*a* to exert a counter force Fa on the sleeve jacket 13 which is directed to the second axis of rotation 27. FIG. 4 shows that the centrifugal force Fb acts on the second arm 21*b* at a distance L1 from the pivot axis PA and the pusher 25 contacts the sleeve jacket 13 at a distance L2 from the pivot axis PA, whereas the distance L1 is larger than L2. This means that the counter force Fa is larger than the centrifugal force Fb. The counter force Fa acts on the sleeve jacket 13 at a location about halfway the axial length of the sleeve jacket 13, see FIG. 3. That is the location at a distance from the barrel plate 15 where the center of gravity of the sleeve 9 lies or close to that. Consequently, the centrifugal force on the sleeve 10 due to its inertia can be balanced by the counter force Fa. This is relevant to minimize a tilting torque on the sleeve 10 about the center point of the piston head 14, which might cause tilting of the sleeve 10 resulting in leakage between the sleeve bottom 12 and the barrel plate 15. The counter force Fa increases with increasing rotational speed of the barrel plate 15 about the second axis of rotation 27**.

FIG. 4 shows that the second arm **21*b* of each of the levers 21 is partly located between two adjacent sleeves 10. This space is available due to the circular-cylindrical shape of the sleeve jackets 13. Each of the second arms 21*b* is shaped such that it does not contact the neighboring sleeves 10, i.e. the sleeve 10 with which it cooperates and a next sleeve 10, and that it does not contact the barrel plate wall 23 under operating conditions. There must be some play between each of the sleeve jackets 13 and the neighboring second arms 21*b*, and between the second arms 21*b* and the barrel plate wall 23, since the sleeves 10 move on the barrel plate 15 causing the levers 21 to rotate slightly. For the same reasons the first arms 21*a* are shaped such that they do not contact the barrel plate wall 23** under operating conditions.

Figure 6:
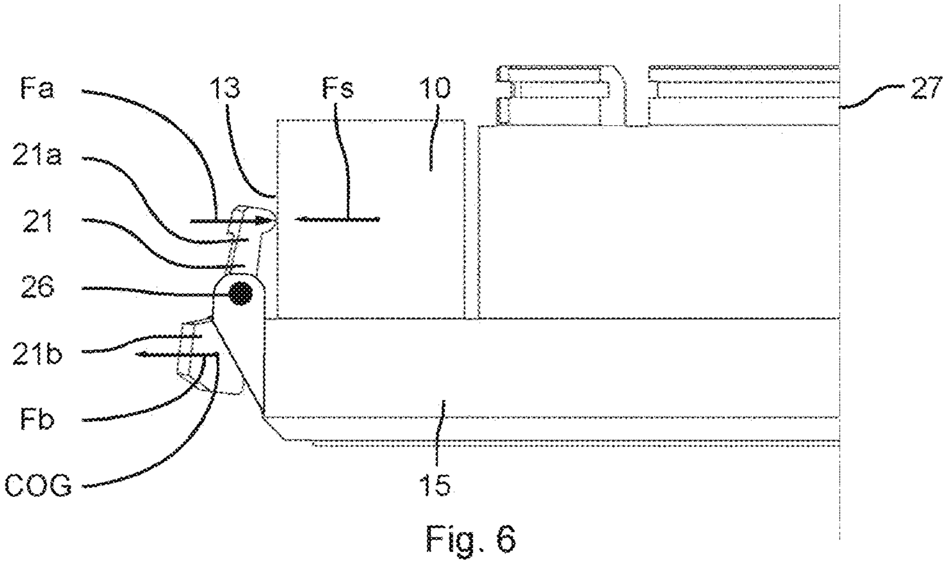
FIG. 6 is a sectional view of a part of an alternative embodiment of the hydraulic device.

FIG. 6 shows a part of a barrel plate 15 of an alternative embodiment of the hydraulic device 1. This figure shows a centrifugal force Fs of the sleeve 10, which is directed away from the second axis of rotation 27. In this embodiment the barrel plate 15 is also provided with a plurality of actuators in the form of levers 21, but the levers 21 have pivots 26 including pivot axes which extend tangentially to the barrel plate 15, i.e. the pivot axes extend perpendicularly to the second axis of rotation 27 and at a distance from the second axis of rotation 27. Similar to the embodiment as described hereinbefore, under operating conditions the lever 21 causes the first arm 21*a* to exert a counter force Fa on the sleeve jacket 13 which is directed to the second axis of rotation 27 due to a centrifugal force Fb on the second arm 21*b* which is directed away from the second axis of rotation 27.

The invention is not limited to the embodiments shown in the drawings and described hereinbefore, which may be varied in different manners within the scope of the claims and their technical equivalents. For example, the counter forces may also be exerted on the sleeves at different locations thereof as long as the counter forces on the respective sleeves are exerted in a direction and at a location such that at least when one of the pistons is at bottom dead center under operating conditions the counter force on the cooperating sleeve acts along a line at a distance from the center point of the piston head and causes a counter torque about the center point of the piston head against the tilting torque.

The invention claimed is:

1. A hydraulic device comprising:

a housing;

a shaft which is mounted in the housing and rotatable about a first axis of rotation, wherein the shaft has a flange extending perpendicularly to the first axis of rotation;

a plurality of pistons including respective spherical piston heads-having respective center points, which pistons are fixed to the flange at equiangular distance about the first axis of rotation and which have centerline parallel to the first axis of rotation;

a plurality of separate sleeves within which the respective pistons are movable and a barrel plate which supports sleeves of the plurality of sleeves, wherein the barrel plate including the sleeves are rotatable about a second axis of rotation which intersects the first axis of rotation by an acute angle such that upon rotating the shaft and the barrel plate including the sleeves each of the pistons moves with respect to a cooperating sleeve between a bottom dead center and a top dead center, wherein the sleeves are configured such that at least when one of the pistons is at bottom dead center under operating conditions a centrifugal force on a cooperating sleeve acts in radial direction from the second axis of rotation between the barrel plate and a center point of the piston head causing a tilting torque about the center point of the piston head; and a plurality of actuators supported by the barrel plate, wherein actuators of the plurality of actuators are configured to exert counter forces (Fa) on the respective sleeves in a direction and at a location such that at least when one of the pistons is at bottom dead center under operating conditions the counter force on the cooperating sleeve acts along a line at a distance from the center point of the piston head and causes a counter torque about the center point of the piston head against the tilting torque, wherein the actuators are controlled such that the counter forces (Fa) increase with increasing rotational speed of the barrel plate about the second axis of rotation.

2. The hydraulic device according to claim 1, wherein the actuators are configured such that the counter forces (Fa) on the respective sleeves are substantially the same when the shaft runs at a fixed speed.

3. The hydraulic device according to claim 2, wherein the counter forces (Fa) act in a radial direction of the second axis of rotation.

4. The hydraulic device according claim 3, wherein the counter forces (Fa) are directed to the second axis of rotation.

5. The hydraulic device according to claim 4, wherein at least when one of the pistons is in bottom dead center, the counter force (Fa) is exerted on the corresponding sleeve at a location between the barrel plate and a center of the piston head.

6. The hydraulic device according to claim 5, wherein the counter forces (Fa) are exerted on the sleeves at a distance from the barrel plate where a center of gravity of the respective sleeves is located.

7. The hydraulic device according to claim 6, wherein the counter forces (Fa) are exerted on outer sides of the sleeves facing away from the second axis of rotation.

8. The hydraulic device according to claim 7, wherein each of the actuators comprises a counterweight which is coupled to the barrel plate and movable with respect to the barrel plate in the radial direction of the second axis of rotation and which cooperates through a transmission with the corresponding sleeve configured to exert the counter force (Fa) on the corresponding sleeve, wherein the transmission and the counterweight are configured such that under operating conditions a centrifugal force on the counterweight causes the transmission to exert the counter force (Fa) on the corresponding sleeve.

9. The hydraulic device according claim 8, wherein each transmission comprises a lever which is mounted to the barrel plate through a pivot having a pivot axis (PA), wherein the lever comprises a first arm and a second arm which extend in different directions from the pivot axis (PA), wherein the first arm cooperates with the corresponding sleeve for exerting the counter force (Fa) on the corresponding sleeve, and the second arm comprises the counterweight, wherein the lever is configured such that under operating conditions a centrifugal force on the second arm due to the counterweight causes the first arm to exert the counter force (Fa) on the corresponding sleeve.

10. The hydraulic device according to claim 9, wherein the pivot axes (PA) extend parallel to the second axis of rotation.

11. The hydraulic device according to claim 10, wherein the pivot comprises a ridge at one of the lever and the barrel plate, which ridge is supported by the other one of the lever and the barrel plate, hence forming a fulcrum.

12. The hydraulic device according to claim 11, wherein the ridge is provided at the lever and the barrel plate comprises a ring-shaped barrel plate wall, which supports the ridges of the respective levers.

13. The hydraulic device according to claim 12, wherein each of the levers is provided with a projection at the corresponding ridge which projection is located in a cooperating hole in the barrel plate wall or wherein each of the levers is provided with a hole at the corresponding ridge which hole accommodates a cooperating projection on the barrel plate wall, wherein the hole and the projection allow a pivoting movement of the lever with respect to the barrel plate about the pivot axis (PA).

14. The hydraulic device according to claim 9, wherein the second arm of each lever is partly located between two adjacent sleeves.

15. The hydraulic device according to claim 9, wherein the pivot axes (PA) extend tangentially to the barrel plate.

16. The hydraulic device according to claim 1, wherein the counter forces (Fa) act in a radial direction of the second axis of rotation.

17. The hydraulic device according to claim 4, wherein the counter forces (Fa) are exerted on the sleeves at a distance from the barrel plate where a center of gravity of the respective sleeves is located.

18. The hydraulic device according to claim 9, wherein the pivot comprises a ridge at one of the lever and the barrel plate, which ridge is supported by the other one of the lever and the barrel plate, hence forming a fulcrum.

19. The hydraulic device according to claim 1, wherein the counter forces (Fa) are exerted on outer sides of the sleeves facing away from the second axis of rotation.

20. The hydraulic device according to claim 1, wherein each of the actuators comprises a counterweight which is coupled to the barrel plate and movable with respect to the barrel plate in the radial direction of the second axis of rotation and which cooperates through a transmission with the corresponding sleeve configured to exert the counter force (Fa) on the corresponding sleeve, wherein the transmission and the counterweight are configured such that under operating conditions a centrifugal force on the counterweight causes the transmission to exert the counter force (Fa) on the corresponding sleeve.

* * * * *